United States Patent
Katayama

(10) Patent No.: US 6,372,950 B1
(45) Date of Patent: Apr. 16, 2002

(54) METHOD OF TREATING A RADIATION PROTECTOR

(75) Inventor: Hideo Katayama, Tokyo (JP)

(73) Assignee: Anzai, Setsu, Tokyo (JP)

( * ) Notice: Subject to any disclaimer, the term of this patent is extended or adjusted under 35 U.S.C. 154(b) by 0 days.

(21) Appl. No.: 09/487,890

(22) Filed: Jan. 19, 2000

(51) Int. Cl.⁷ ............................................... G21F 9/00
(52) U.S. Cl. ..................................................... 588/12
(58) Field of Search .............................. 588/10, 11, 12, 588/14, 15, 18, 19

(56) References Cited

U.S. PATENT DOCUMENTS

| | | | | |
|---|---|---|---|---|
| 4,338,215 A | * | 7/1982 | Shaffer et al. ............... | 252/628 |
| 5,434,333 A | * | 7/1995 | Jantzen et al. ................. | 588/3 |
| 5,678,236 A | * | 10/1997 | Macedo et al. ................ | 588/11 |
| 5,926,771 A | * | 7/1999 | Brown ........................... | 588/2 |

\* cited by examiner

*Primary Examiner*—Wayne Langel
*Assistant Examiner*—Edward M. Johnson
(74) *Attorney, Agent, or Firm*—Armstrong, Westerman & Hattori, LLP

(57) ABSTRACT

A radiation protector treating method including the steps of pulverizing a used radiation protector to obtain a pulverized radiation protector material and mixing the pulverized radiation protector material with boron powder and bismuth powder, and casting the pulverized radiation protector material mixed with the powders into an electric melting furnace and also casting silicon powder, lead oxide powder and carbon powder into the electric melting furnace. Radioactive contamination is prevented by using a radiation attenuating and absorbing material for each of various radioactive substances attached to the radiation protector.

1 Claim, 1 Drawing Sheet

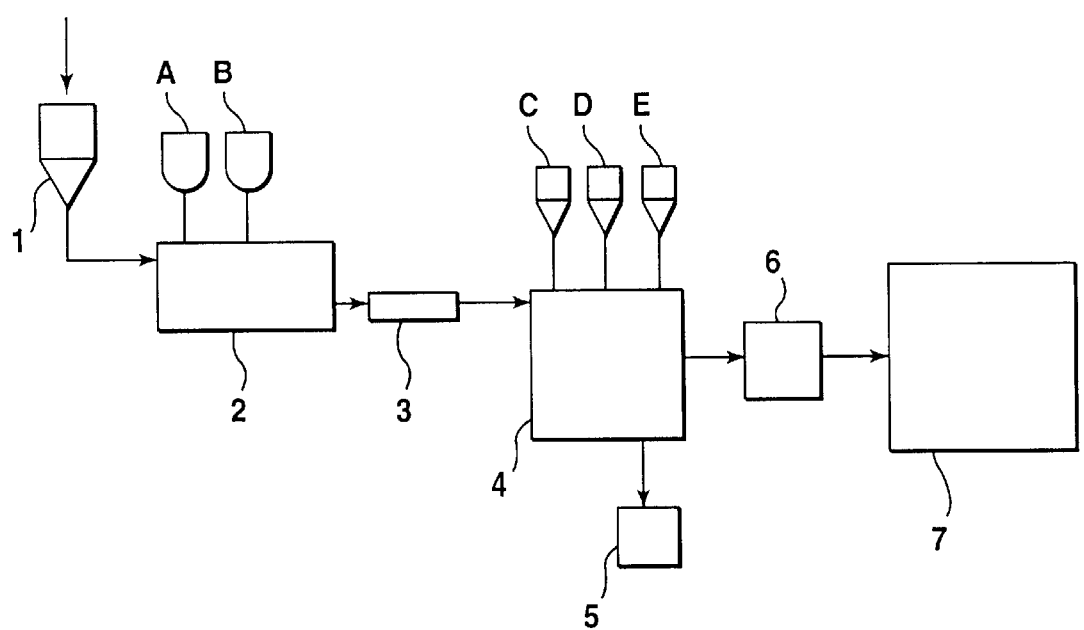

METHOD OF TREATING A RADIATION PROTECTOR

BACKGROUND OF THE INVENTION

The present invention relates to a method of treating a radiation protector and a system therefor. Conventionally, the wearing of a radiation protector is practiced at places where a radioactive material relating to nuclear energy is handled to protect the human body from exposure to radiation. Extreme care is necessary for a technique and system for treating a used radiation protector. There are a few treating systems capable of minimizing the incidence of radiation injury caused by radioactive substances attached to a used radiation protector, particularly radioactive substances emitting gamma radiation, radioactive isotopes, neutron-emitting radioactive substances, etc.

SUMMARY OF THE INVENTION

In view of the above-described problem, an object of the present invention is to provide a radiation protector treating method capable of preventing radioactive contamination by using a radiation attenuating and absorbing material for each of various radioactive substances attached to a radiation protector, and also provide a system suitably used to carry out the radiation protector treating method.

Another object of the present invention is to confine radioactive substances attached to a used radiation protector by pulverizing and melting the radiation protector into a glassy state and forming a solid glass body consisting essentially of lead glass.

To attain the above-described objects, the present invention provides a radiation protector treating method including the steps of pulverizing a used radiation protector to obtain a pulverized radiation protector material and mixing the pulverized radiation protector material with boron powder and bismuth powder, and casting the pulverized radiation protector material mixed with the powders into an electric melting furnace and also casting silicon powder, lead oxide powder and carbon powder into the electric melting furnace.

In addition, the present invention provides a radiation protector treating system including a radiation protector pulverizer for pulverizing a used radiation protector to obtain a pulverized radiation protector material. A boron powder storage tank and a bismuth powder storage tank are connected to the radiation protector pulverizer. The system further includes an electric melting furnace for melting the pulverized radiation protector material, which has been pulverized by the radiation protector pulverizer, into a glassy state. A silicon powder storage tank, a lead oxide powder storage tank and a carbon powder storage tank are connected to the electric melting furnace.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

The FIGURE is a block diagram showing an embodiment of the radiation protector treating system according to the present invention.

DESCRIPTION OF THE PREFERRED EMBODIMENTS

An embodiment of the present invention will be described below with reference to the accompanying drawing.

A used radiation protector cast into a hopper 1 is sent to a radiation protector pulverizer 2 where it is pulverized to obtain a pulverized radiation protector material. During the pulverization, an appropriate amount of powder is cast into the radiation protector pulverizer 2 from each of a boron powder storage tank A and a bismuth powder storage tank B, which are connected to the radiation protector pulverizer 2. Thus, the pulverized radiation protector material is mixed with the added powders.

The boron powder mixed with the pulverized radiation protector material attenuates the energy of neutrons emitted from radioactive substances attached to the pulverized radiation protector material, and the bismuth powder attenuates the energy of gamma radiation emitted by radioactive substances attached to the pulverized radiation protector material to reduce the influence of gamma radiation.

Next, the pulverized radiation protector material mixed with the radiation attenuating and absorbing powders is sent into an electric melting furnace 4 by a conveyor 3. While the pulverized radiation protector material is being cast into the electric melting furnace 4, an appropriate amount of powder is cast into the electric melting furnace 4 from each of a silicon powder storage tank C, a lead oxide powder storage tank D and a carbon powder storage tank E, which are connected to the electric melting furnace 4.

The added silicon powder is a material for forming the pulverized radiation protector material melted in the electric melting furnace 4 into a glassy state. The lead oxide powder changes the glassy material into a soft state (lead glass) to confine the emissions from radioactive substances. The amount of silicon powder added is larger than the amount of lead oxide powder added. The carbon powder mixed with the pulverized radiation protector material is a material for adjusting the electric current flowing between electrodes used in the electric melting furnace 4. The carbon powder allows the melt temperature of the pulverized radiation protector material to be adjusted with any desired electric current.

The molten pulverized radiation protector material forms a glassy melt with the silicon powder and the lead oxide powder. The molten glass of the pulverized radiation protector material flows out of the electric melting furnace 4 into a cooling vessel 5. The molten glass of the pulverized radiation protector material flowing into the cooling vessel 5 cools down with time to become a solid glass body. The energy of radiation from the solidified glass of the pulverized radiation protector material, particularly the energy of gamma radiation and neutrons, is reduced.

Regarding exhaust gas from the electric melting furnace 4, radioactive exhaust gas and other noxious gas are absorbed by a carbon gas absorber in a filter 6, and the exhaust gas is stored in a subsequent terminal chamber 7. The terminal chamber 7 is a closed chamber. Even if a radioactive gas flows into the terminal chamber 7, radiation cannot leak out of it.

What is claimed is:

1. A radiation protector treating method, for use with an electric melting furnace having electrodes, comprising the steps of:
   first, pulverizing a used radiation protector to obtain a pulverized radiation protector material and mixing the pulverized radiation protector material with boron powder and bismuth powder; then
   casting said pulverized radiation protector material mixed with said boron powder and bismuth powder into an electric melting furnace having electrodes and also casting a selected amount of silicon powder, lead oxide powder and carbon powder into the electric melting furnace; and then melting the material cast in said electric melting furnace to form a glassy melt; wherein said carbon powder amount is selected for adjusting electric current between electrodes so as to control the temperature of the glassy melt.

* * * * *